(12) United States Patent
Grotz

(10) Patent No.: US 8,061,045 B2
(45) Date of Patent: Nov. 22, 2011

(54) SLIDING DEVICE

(75) Inventor: Jurgen Grotz, Wiggensbach (DE)

(73) Assignee: Maha Maschinenbau Haldenwang GmbH & Co. KG, Haldenwang (DE)

( * ) Notice: Subject to any disclaimer, the term of this patent is extended or adjusted under 35 U.S.C. 154(b) by 221 days.

(21) Appl. No.: 12/457,583

(22) Filed: Jun. 16, 2009

(65) Prior Publication Data
US 2010/0001167 A1 Jan. 7, 2010

(30) Foreign Application Priority Data

Jul. 4, 2008 (DE) .................... 10 2008 031 763

(51) Int. Cl.
*G01B 5/24* (2006.01)
(52) U.S. Cl. ................................... 33/203.12
(58) Field of Classification Search ............... 33/203.12, 33/203.13, 203.14
See application file for complete search history.

(56) References Cited

U.S. PATENT DOCUMENTS

| | | | |
|---|---|---|---|
| 2,821,790 A * | 2/1958 | Retherford ................ | 33/203.12 |
| 3,875,672 A | 4/1975 | Castoe | |
| 4,897,926 A | 2/1990 | Altnether et al. | |
| 4,924,591 A | 5/1990 | Brodu | |
| 5,129,149 A * | 7/1992 | Colarelli et al. .......... | 33/203.14 |
| 6,256,894 B1 * | 7/2001 | Naruse et al. ............. | 33/203.12 |
| 6,564,461 B1 * | 5/2003 | Naruse ...................... | 33/203 |
| 2003/0098206 A1 | 5/2003 | Gallese | |
| 2004/0026591 A1 * | 2/2004 | Lambrecht et al. ....... | 33/203.14 |
| 2005/0133309 A1 | 6/2005 | Liebetreu et al. | |
| 2006/0143931 A1 * | 7/2006 | Jackson .................... | 33/203.12 |
| 2007/0039400 A1 | 2/2007 | Meyer et al. | |
| 2009/0288305 A1 * | 11/2009 | Tentrup et al. ............ | 33/203.12 |

OTHER PUBLICATIONS

Apr. 28, 2011 Notice of Allowance issued in European Application No. 09163090.5.
Dec. 11, 2009 Search Report issued in European Application No. 09163090.5 (with translation).
Mar. 4, 2010 Office Action issued in European Application No. 09163090.5.
Oct. 5, 2010 Office Action issued in European Application No. 09163090.5.

* cited by examiner

*Primary Examiner* — Brad Bennett
(74) *Attorney, Agent, or Firm* — Oliff & Berridge, PLC

(57) ABSTRACT

The invention relates to a sliding device for receiving vehicle wheels in a substantially stress-free manner, comprising a carrier unit and a top plate slidably supported on the carrier unit, wherein a vehicle wheel may be borne in a substantially almost force-free and torque-free manner at least in a horizontal direction by using the top plate.

15 Claims, 4 Drawing Sheets

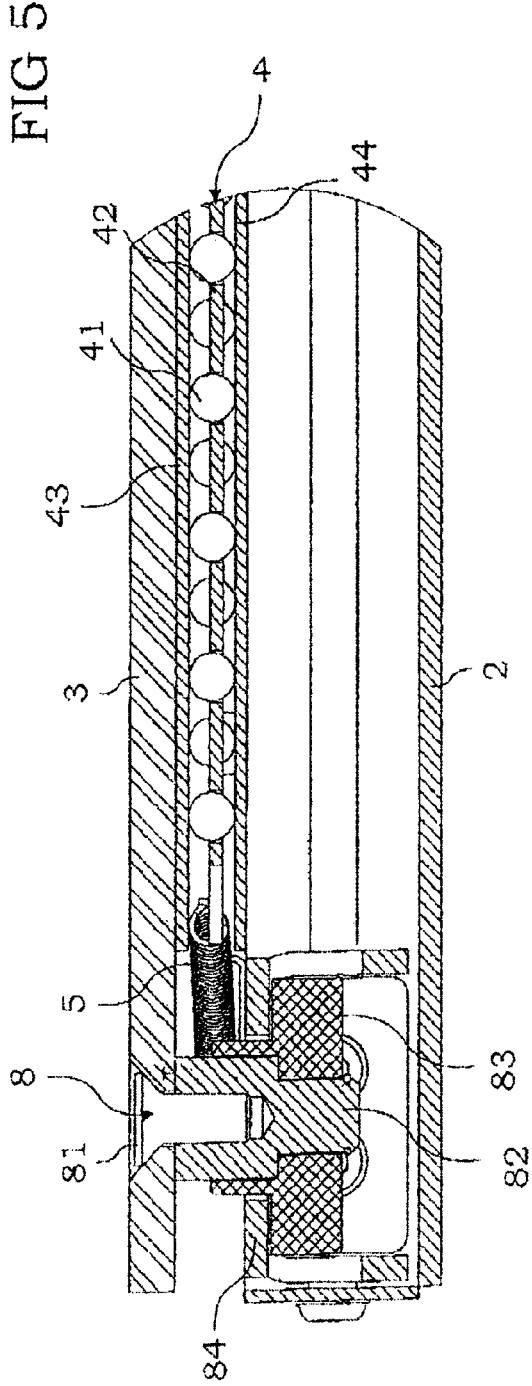
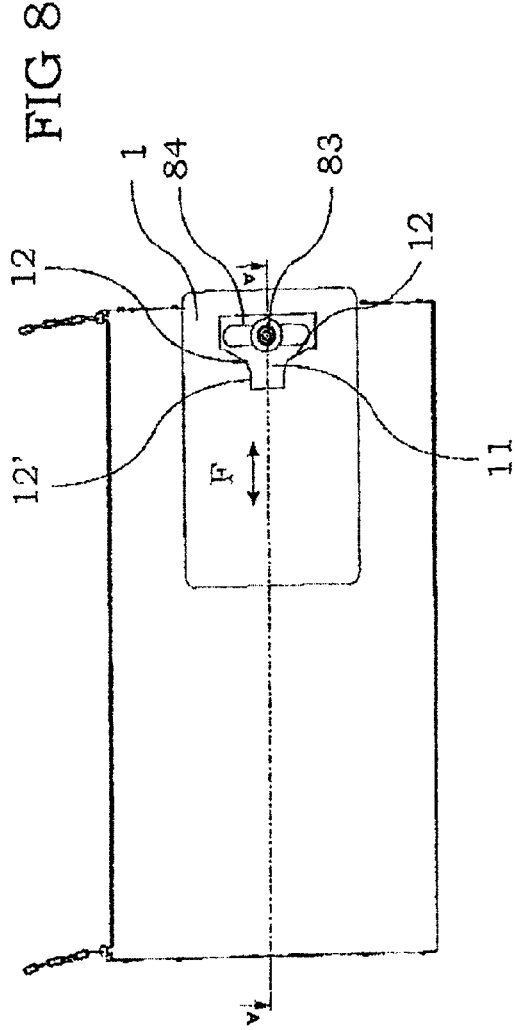

SLIDING DEVICE

The invention relates to a sliding device for receiving vehicle wheels mounted on a vehicle in a substantially stress-free manner, the device enabling a particularly reliable measurement of the parameters of the wheel position, such as dive and trail angles of the wheels of a vehicle. During this process it is possible to ensure high measuring precision over a long service life of the sliding device.

As a link between the road and the vehicle structure running gears consisting of wheels and wheels suspensions are a decisive factor for the movement dynamics of a vehicle and at the same time are also relevant for safe driving. Modern running gear do not only have a substantially vertical degree of freedom for compensating road unevenness but travel on precisely predefined envelopes, such as multi-link axles, during spring deflection and rebound actions or steering activities. Suitable wheel guiding geometries reduce movements of the structure, with kinematic magnitudes such as trail angle, dive angle and spread angle being of particular importance for the wheel positions during steering and spring movements as well as for transferring the forces between the road and the vehicle tyre. Due to the complexity of modern running gears and the influence of the kinematic wheel parameters on driving safety a particularly high degree of precision is required when the trail and drive angles are set.

In practice, optical measurement systems are used to sense the dive and trail angles, which measure the parameters of the vehicle wheel in a contact-free manner while the vehicle is standing on a test stand floor or garage floor.

However, in such devices known from the prior art the problem arises that due to lateral forces in the wheel contact patch, which are caused e. g. by steering movements or deflection/rebound movements of the wheels, tensions occur in the running gear components which lead to measuring errors when the dive and trail values are obtained.

It is an object of the present invention to provide a device which can receive vehicle wheels such that the measuring errors occurring during trail or dive measurements can be reduced.

This object is achieved by a device and a method comprising the features of the independent claims. The dependent claims indicate advantageous embodiments of the present invention.

In order to achieve this object the invention teaches a sliding device for receiving vehicle wheels in a substantially stress-free manner, comprising a carrier unit and a top plate, the top plate being slidably supported on the carrier unit, and wherein a vehicle wheel may substantially be borne in an approximately force-free and/or torque-free manner at least in a horizontal direction by using the top plate. Thus, it is possible in a particularly easy way to almost free the vehicle wheel to be tested from lateral forces acting substantially in a transverse direction to the longitudinal axis of the vehicle or from torques acting about a vertical axis of the vehicle whereby tensions in the vehicle wheel and the running gear components, respectively, are reduced and the measuring precision is enhanced.

Furthermore, the breakaway force and/or the initial breakaway torque may be substantially independent of the outer dimensions, in particular the length, and/or the weight of the top plate. This allows the use of long top plates whereby it is no longer necessary to slide the sliding unit along the longitudinal axis of the vehicle in order to adapt the position of the sliding unit to the wheel center distance of the vehicle to be tested. Thus, it is ensured that even in case of different wheel center distances the vehicle wheels are supported on the top plate. This leads to the advantage that vehicles having the most different wheel center distances may be tested without the necessity to adapt to the vehicle by sliding the device.

Moreover, at least one bearing unit may be provided between the carrier unit and the top plate, which enables the performance of a lateral movement of the top plate substantially perpendicular to a longitudinal axis of a vehicle and/or a rotational movement of the top plate substantially about a vertical axis of a vehicle. Providing a bearing unit offers the advantage that the frictional forces between the top plate and the carrier unit are reduced and thus small forces in the vehicle wheel may also be neutralized.

Furthermore, a locking means may be provided with which the top plate may be firmly locked with respect to the carrier unit, wherein forces occurring in the wheel and acting substantially in a horizontal direction may be carried over by the locking means into the carrier unit via the top plate. In this case, by using the locking means, it may be possible to transfer the top plate to a predetermined position with respect to the carrier unit. This leads to advantages in that the sliding device may be protected from damage by excessive stress. Such damage occurs in particular if lateral forces exceeding an admissible extent occur in the wheel contact patch. Such forces are generated, for example, by driving a vehicle too fast or obliquely onto the sliding device, the top plate performing such large sliding relative to the carrier unit that the sliding device is damaged. Furthermore, the locking means offers the advantage that after a track width measurement, after which the vehicle has been removed from the sliding device, the top plate may be slid back to a predetermined original starting position by using the locking means if the top plate does not return to its starting position by itself.

Moreover, the device may have a positioning means with which the bearing unit may be transferred to a predetermined position if the top plate is not in contact with a vehicle wheel and is in an unlocked state.

Furthermore, by using the positioning means it is possible to transfer the bearing unit as well as the top plate to a predetermined position if the top plate is not in contact with a vehicle wheel and is in an unlocked state. This offers the advantage that the sliding device may self-transfer to a predetermined starting position after a measuring operation or before a measuring operation if no vehicle has been driven onto the sliding device.

Moreover, the positioning means may be a spring member and/or the locking means may be a marking bolt or a positioning crank.

Furthermore, the bearing unit may have a cage and roll bodies in the form of balls, the cage being filled at least partly or completely with balls.

Moreover, the carrier unit may have at least one device for removing moisture and/or soil particles. The device for removing moisture and/or soil particles may be arranged such that access of the moisture and/or the soil particles to the bearing unit may be prevented. To this end, the device for removing moisture and/or soil particles may alternatively be in the form of a groove or a channel. Thus, it can be effectively prevented that soil or moisture gets onto sliding surfaces of the bearing unit, which might lead to an increase of the initial breakaway torque and thus to a reduction of the measuring accuracy and consequently to a deterioration of the friction characteristics of the bearing unit.

Furthermore, the device for removing moisture and/or soil particles may be a drain channel running at least in sections substantially parallel to an edge of the top plate. In this case, the drain channel may be formed circumferentially on a surface of the carrier unit.

Moreover, the carrier unit may have at least two drain channels running substantially parallel to an edge of the top plate and/or parallel to each other wherein in a position in which the top plate is maximally offset with respect to the carrier unit the top plate covers at least one drain channel at least in part across the entire length thereof. In this case, the top plate may cover the drain channel completely across the entire length thereof and at least in part across the width thereof. From this, the advantage results that water and soil particles always drip off the top plate into a channel or between two channels, respectively, and are led away from the bearing unit along the drain channel. Such arrangement offers the advantage that no additional sealing members are required and thus the number of components may be reduced.

Furthermore, a guiding member may be provided for determining the direction of the lateral movement between the carrier unit and/or the top plate and/or for determining the rotational movement of the carrier unit substantially about the vertical axis of a vehicle. Thus, it is possible to determine the maximally admissible movement limits with respect to the carrier unit in a particularly easy way. In addition to this, the guiding member may also be used as a safeguard in the sense of a function integration and prevent the top plate from slipping off the carrier unit in an unlocked state.

Moreover, a measuring and evaluating unit may be provided with which the trail angle of the right and/or the left wheel of a vehicle axis may respectively be output. It is possible to realise an overall system therewith in a particularly easy way, which enables a holistic trail angle measurement without having to connect additional measuring means to the sliding device.

Furthermore, the device may be formed as a mobile unit and/or may be retrofitted on running rails of lifting platforms and/or test stands. This leads to the advantage that the device can be replaced by the service staff at various sites of application.

Moreover, a lifting device, particularly for lifting vehicles, may be provided, comprising at least one lifting unit, at least one running rail, and at least one sliding device, wherein a sliding device comprising a carrier unit is substantially firmly connected to the running rail.

As a summary, further features and advantages of the invention shall be mentioned in the following. The carrier unit and the top plate may consist of aluminum profiles, whereby corrosion problems are eliminated. This is an essential advantage of this device because the mentioned components frequently come into contact with corrosive substances such as water or de-icing salt. Furthermore, the device may be characterized in that all parts firmly connected with each other are joined by screws, adhesive and/or rivets. Apart from the advantage of easy assembly it is possible to also eliminate the disadvantages of welding connections which may occur, for example, in the form of component distortion. Thus, no laborious reworks such as aligning components or annealing for relieving stresses of the components are necessary. Here, it is possible to simultaneously achieve high accuracy and smooth running of the device. Another advantage of the aluminum profiles can be seen in the low weight which makes it possible to easily transport the complete sliding plate from one site of application to another. Moreover, the bearing unit may be formed in the shape of a ball-bearing comprising a ball cage completely filled with balls. Such bearing unit ensures optimal load distribution and thus guarantees the smooth running of the sliding device. Thus, it can be ensured that the initial breakaway torque and the breakaway force, respectively, are almost independent of the length of the sliding device. This offers the advantage that long top plates may be used whereby it is not necessary to adapt the position of the sliding device to the wheel center distance of vehicles to be tested and thus the testing duration is shortened. Furthermore, a plurality of bearing units may be provided between the carrier unit and the top plate in the longitudinal direction thereof. The top plate may be constructed in an extended or shortened manner by using such a modular structure, in which case merely the aluminum profiles and a cover plate must be extended or shortened to a corresponding length.

Below, the invention will be explained by way of drawings showing mere embodiments. In a schematic representation:

FIG. 5 shows a detailed view of cut-out Z shown in FIG. 3;

FIG. 8 shows a plan view of a positioning crank.

Figure 1:
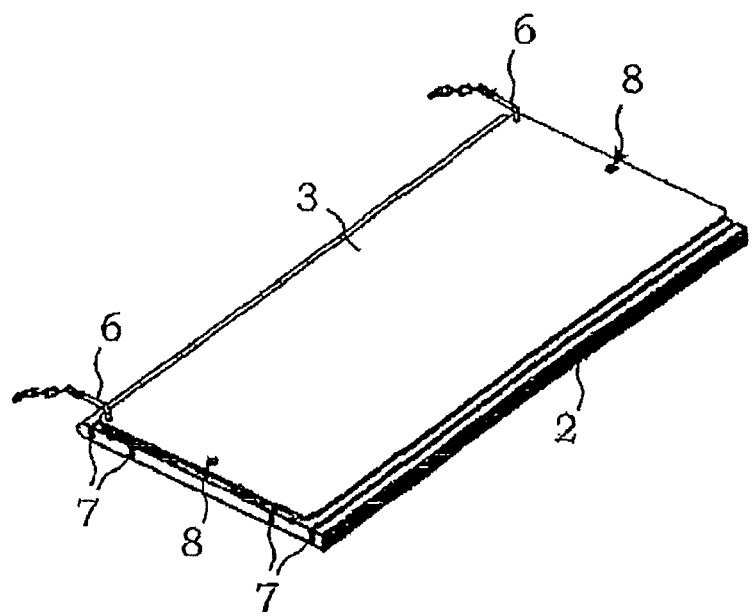
FIG. 1 shows a perspective view of the sliding device.

FIG. 1 shows the overall structure of the sliding device with a substantially rectangular, flat top plate 3 being arranged parallel to a carrier unit 2. The top plate 3 has a respective guiding member 8 in the center of its long side end portions, which is able to slide in a guiding rail 84 provided in the carrier unit 2. Bores are provided at the lower long side corners of the top plate 3 through which locking means 6 in the shape of marking bolts can be inserted.

The carrier unit 2 together with its long side central axis is congruently aligned parallel to and coincidental with a long side central axis of the top plate 3 in a vertical direction. The carrier unit 2 has bores which in the above-described alignment flush with the bores in the long side lower corners of the top plate 3. Thus, a respective locking means 6 may be guided through the flushing bores of the top plate 3 and the carrier unit 2 so that a relative offset between the top plate 3 and the carrier unit 2 is not possible.

In the carrier unit 2 drain channels 7 are provided in parallel to the long sides of the carrier unit 2. In FIG. 1 they are shown by channels or grooves 7. The drain units 7 are used to drain water and soil particles dripping from the wheels to be tested onto the top plate 3 and getting from the top plate 3 onto the carrier unit 2.

Figure 2:
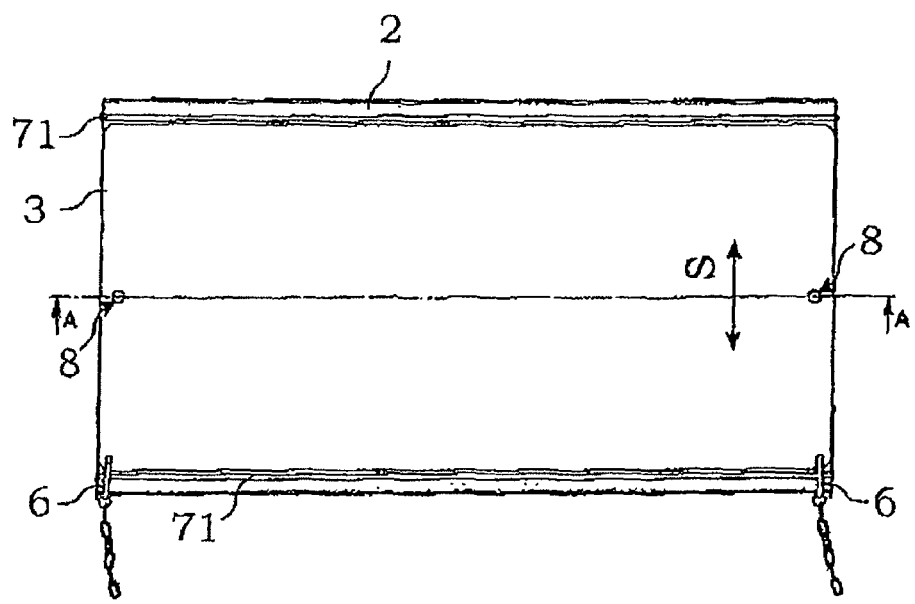
FIG. 2 shows a plan view of the sliding device.

FIG. 2 shows a plan view of the sliding unit. It can be taken from FIG. 2 that the top plate 3 does not cover the outer drain channels 71 with its longitudinal edges when it is centrally oriented with respect to the carrier unit, but only the inner drain channels 7. These inner drain channels are not recognizable in FIG. 2 because they are concealed by the top plate 3. Thus, soil or water particles get from the top plate 3 between the inner and the outer drain channels 71 which ensures that the particles always run into the inner drain channels and thus are not able to get into the bearing unit 4 even if these particles move towards the central axis of the carrier unit 2. This construction proves advantageous insofar as the occurrence of corrosion on the bearing unit may thereby be prevented and a long service life of the bearing unit 4 and simultaneously high functional accuracy of the sliding device may be realised. Advantageously, the breakaway force has a value of 12-18 N, preferably, however, 15 N, and the initial breakaway torque has a value of 2-8 Nm, preferably, however, 5 Nm.

In a maximum deflection of the sliding unit the top plate is offset with respect to the carrier unit 2 so far at most that a longitudinal edge of the top plate 3 moving in the direction of the double arrow S is above the inner drain channel 72. Due to the construction, it is not possible to offset a longitudinal edge across the inner drain channel 72 towards the central axis of the carrier unit 2, represented by the cutting line A-A. Thus, it is ensured that even in case of a maximum deflection of the top plate 3 soil and water particles drip from the top plate 3 at least into the inner drain channel 72 and not between the bearing unit 4 and the inner drain channel 72. Such deflection is not shown in FIG. 2, however, the person skilled in the art may unambiguously take from the above description how this position is reached, that is, by offsetting the top plate 3 along the arrow S relative to the carrier unit 2.

Figure 3:
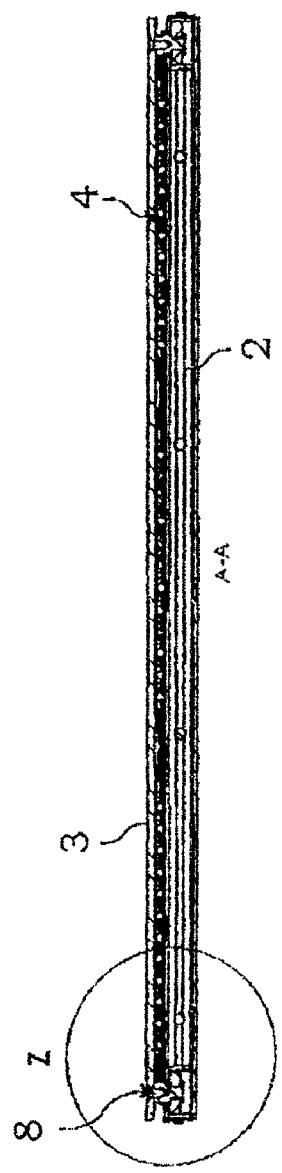
FIG. 3 shows a sectional view of the sliding device along cutting line A-A of FIG. 2.

FIG. 3 illustrates a sectional view of the sliding device along the cutting line A-A of FIG. 2. It can be recognized that the top plate 3 consists of solid material, steel, aluminum, composite material and/or high-grade steel. The top plate rests on at least one bearing unit 4 which in turn is supported on the carrier unit 2. The carrier unit 2 consists of profiles, preferably made of aluminum or stainless high-grade steel, firmly fastened to each other at their long sides via fasteners. The aluminum or high grade steel profiles lying in the transverse direction of the carrier unit 2 have channels or grooves on the upper surfaces to ensure the draining of water or soil particles. This draining is made in the longitudinal direction of the aluminum profiles and thus in the longitudinal direction of the carrier unit 2.

Figure 4:
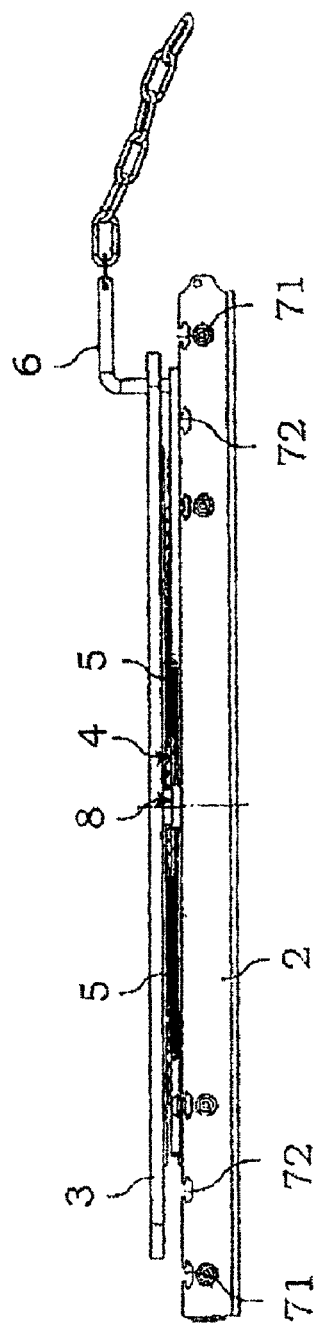
FIG. 4 shows a side view of the sliding device of a left end side of the device, which is perpendicular to cutting line A-A shown in FIG. 2.

FIG. 4 shows a side view of the sliding device from a side substantially perpendicular to the sectional axis A-A. In this view the drain channels 7 can be seen particularly well. Here, the outer drain channels 71 have a larger distance to a central line A-A of the carrier unit 2 than the inner drain channels 72. Furthermore, the inner drain channels 72 are covered in the vertical direction by the top plate 3.

The top plate 3 is supported on the carrier unit 2 via at least one bearing unit 4. Furthermore, positioning means 5 in the shape of springs can be recognized. At one end, the positioning means 5 are firmly connected to the carrier unit 2 via a mount 51 and at the other end to the bearing unit 4. Moreover, the guiding member 8 can be recognized which is connected to the top plate 3 and guided in the carrier unit 2. In the position as shown, the sliding unit is in a locked state, the locking means 6 being inserted through the flushing bores of the top plate and the carrier unit 2.

FIG. 5 shows an enlargement of the detail Z of FIG. 3 in a lateral view. This lateral view is substantially perpendicular to the direction of the sliding arrow S of FIG. 2. The same reference numerals as in FIGS. 1, 2, 3, and 4 designate the same members. FIG. 5 clearly shows the structure of the bearing unit 4. In the bearing unit 4 as shown, balls held in a cage 42 are used as roll bodies 41. However, in an embodiment of the invention, not shown, rolls may also be used as roll bodies. The bearing unit 4 has a first runway 43 connected to the top plate 3 and a second runway 44 connected to the carrier unit 2. If the top plate 3 is slid relative to the carrier unit 2 in a direction perpendicular to that of the drawing plane, the roll bodies 41 will roll on the first runway 43 as well as on the second runway 44. Due to the weight of the top plate 3, slipping or a combination of rolling and slipping between the roll bodies and the runways is not possible.

In addition thereto, the positioning means 5 can be recognized which is connected to the cage 42 of the bearing unit 4 at one end and connected to the carrier unit 2 at a second end hidden in this view. If the top plate 3 is slid from its idle position, the bearing unit 4 and thus the cage 42 will also be offset. It can be ensured by using the positioning means 5 that the bearing unit 4 and thus the top plate 3 as well will be taken back to their starting positions if the top plate 3 is not loaded with a vehicle wheel.

There is a linear connection between the sliding movement of the top plate 3 and the bearing unit 4 in that the sliding amount of the top plate is always twice as large as the sliding of the bearing unit 4 and the cage 42, respectively.

Furthermore, FIG. 5 describes the detailed structure of the guiding member 8. The guiding member 8 has a fastener 81 by which it is connected to the top plate 3. The fastener 81 may be a screw or a rivet connecting the top plate 3 to a retaining member 82. The retaining bolt 82 may be used as a bush or sliding bearing on which a sliding member 83 is disposed. The sliding member 83 may optionally be a roll, a pulley or a sliding bearing, made e. g. of Teflon and characterized by a low starting friction coefficient. The sliding member 83 is guided in a guiding rail 84 firmly connected to the carrier unit 2. The guiding rail may optionally be formed directly in the carrier unit 2 or firmly connected to the carrier unit 2 as an additional component. Preferably, the guiding rail 84 is a longitudinal hole formed in the carrier member 2, the longitudinal axis of which is substantially perpendicular to the cutting line A-A of FIG. 2 or is aligned parallel to the sliding vector S of FIG. 2.

In the embodiment as shown the positioning means 5 are tension springs in order to center the cage 42 centrally with respect to the carrier unit 2. The retaining bolt 82 is used as an axle for a roll 83 acting as a guide of the top plate 3 as well as for limiting the maximum lateral deflection thereof. In addition thereto, the roll 83 represents a fixation for the top plate 3 so that it is not possible to remove the top plate 3 as long as the fastener 81 is not detached.

Figure 6:
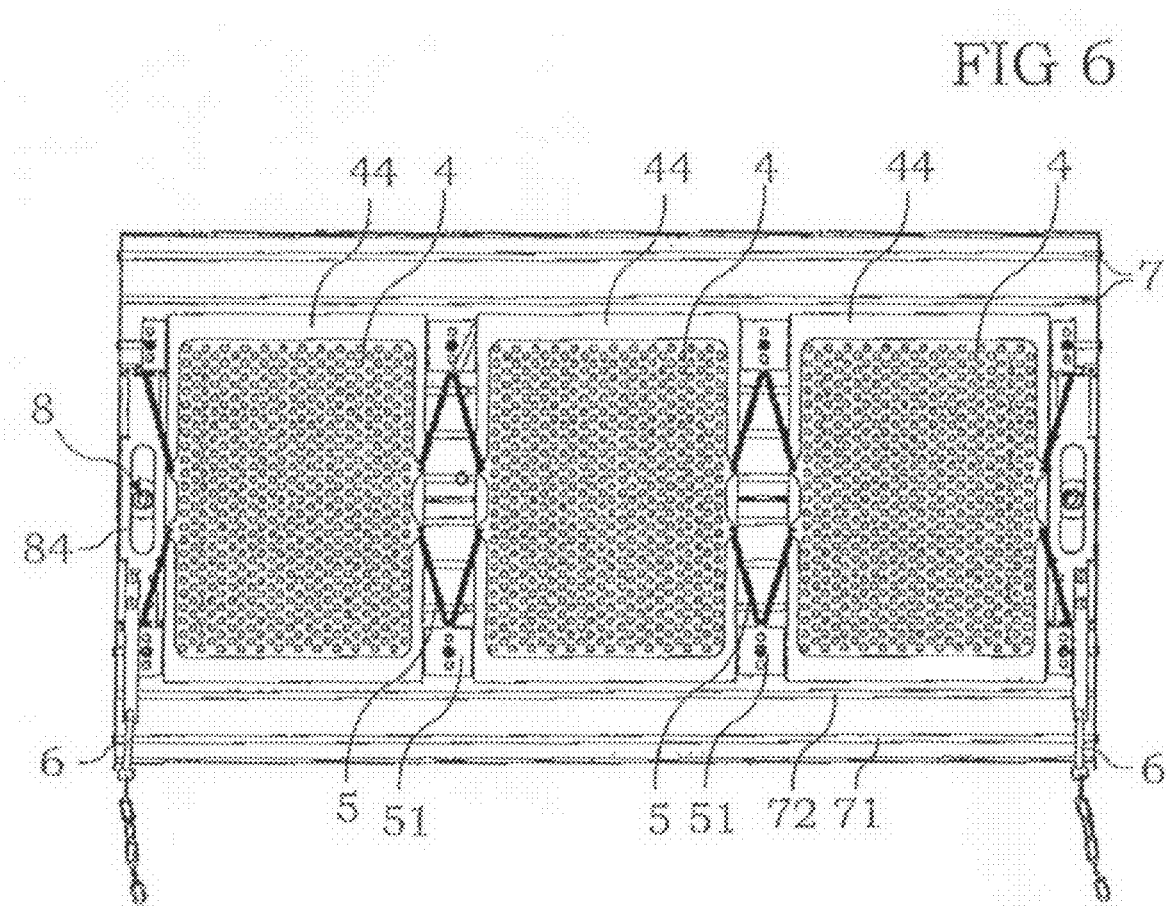
FIG. 6 shows a plan view of another embodiment of the sliding device with the top plate removed.

FIG. 6 shows a plan view of the sliding device with the top plate 3 removed. This view shows another embodiment of the inventive sliding device, with a plurality of bearing units 4 arranged one behind the other in the longitudinal direction of the carrier unit 2 being provided. Here, each bearing unit 4 is connected to the carrier unit 2 via a second runway 44.

In this view it is possible to recognize the positioning means 5 which are connected to the bearing unit 4 at one respective end thereof and firmly connected to the carrier unit 2 at the other end via a mount 51. In this case, each bearing unit 4 is connected to the carrier unit 2 via four positioning means 5. The mount 51 is also used as a guide for the bearing units 4 when they move perpendicularly to the central axis A-A of the top plate 3 corresponding to the direction of the double arrow S of FIG. 2.

Furthermore, it is well possible to recognize the above-described guiding rails 84 in this view which are formed in the shape of longitudinal hole bores extending perpendicular to the longitudinal edge of the carrier unit 2 and arranged mirror-symmetrically to a long-side bisecting line of the carrier unit 2.

Moreover, FIG. 6 also shows an alternative arrangement of the locking means 6. In this case, the bores into which the locking means 6 is inserted are not directly provided in the carrier unit 2 but in an additional member firmly fixed to the carrier unit 2. These bores also flush with the bores in the top plate 3 as already described in the first embodiment of FIGS. 1 and 2.

Figure 7:
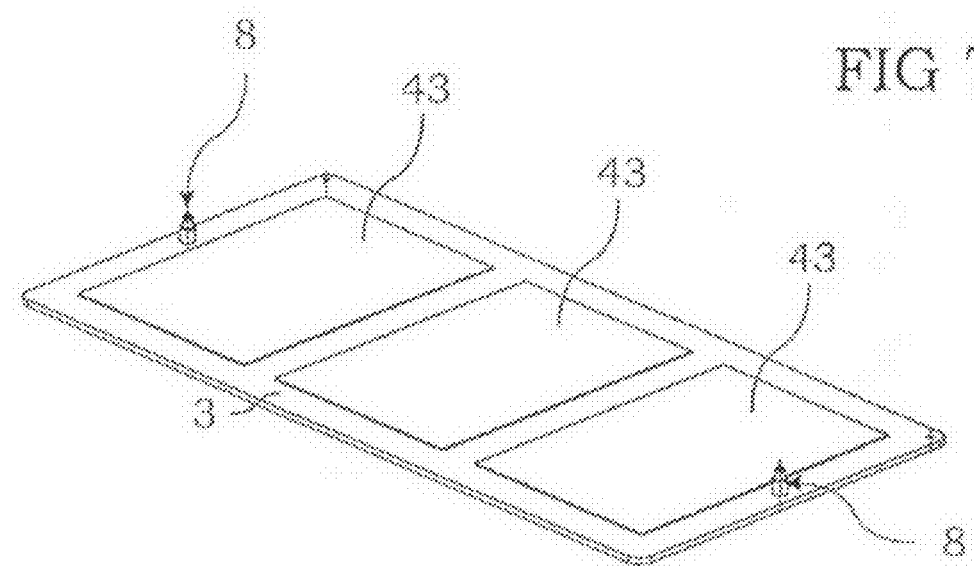
FIG. 7 shows a perspective view of the top plate of the embodiment shown in FIG. 6.

FIG. 7 shows a top plate 3 which is part of the second embodiment of the invention described in FIG. 6. In this top plate 3 a respective first runway 43 is provided for each of the bearing units 4. In an assembled state the top plate 3 shown in FIG. 7 is placed on the carrier unit 2 such that the first runways 43 come into contact with the roll bodies 41 of the bearing units 4.

FIG. 8 shows an alternative locking means 6 in the shape of a positioning crank 1. This positioning crank 1 is slidably supported on the lower side, i. e., on a side facing away from the top plate 3, of the carrier unit 2 in the longitudinal direction of the carrier unit 2. In FIG. 8, the sliding member 83 and the guiding rail 84 can be recognized. If the top plate 3, having been deflected, remains in this deflected position and does not return by itself to the starting position, it is possible to centrally realign the top plate 3 by using the positioning crank 1. To this purpose, the positioning crank 1 is aligned mirror-symmetrically to the central axis A-A of the carrier unit 2 and has a guiding portion 11 comprising sidewalls 12, 12'. When the positioning crank 1 is slid along the guiding arrow F, the sliding member 83 comes into contact with the sidewalls 12 and is returned to its central starting position. Additionally, the positioning crank 1 has a locking function. If the sliding member 83 is located in a guiding portion 11 between the sidewalls 12', it will be prevented from substantially moving in a direction perpendicular to the direction of the double arrow F by these sidewalls 12'. Thus, it is possible to omit the above-described marking bolts as locking means. In an alternative embodiment of the invention, not shown, the positioning crank 1 may have two recesses in the shape of guiding portions 11 comprising sidewalls 12, 12' sloping at varying degrees. In this case, there is a sliding member 83 in each guiding portion 11, with both guiding members 8 being simultaneously activated when the positioning crank 1 is operated and thus the top plate 3 is transferred to its central starting position.

In a further embodiment of the invention marking bolts as well as at least one of the above-described positioning cranks 1 may be provided as locking means 6.

Below, the mode of operation of the device shall be explained in more detail by way of an exemplary procedure of a measuring method. In this case, the sliding device is connected to a garage floor or a running rail of a lifting platform. In this case, the carrier unit 2 is connected in a stationary manner to the garage floor or the running rail. The top plate 3 is secured against sliding in relation to the carrier unit 2 by means of the locking means 6. Now a vehicle is driven onto the sliding device, with a wheel being placed on the top plate 3. Next, the locking means 6 are removed. Lateral forces in the wheel cause the top plate 3 to move in the direction of the double arrow S until the lateral forces have decreased to zero value. In this state the wheel is track measured. After the track measurement is completed, the vehicle is driven off the sliding device, the top plate 3 being returned to its starting position by the positioning means 5. The locking means 6 are inserted through the flushing bores.

Alternatively, it is possible to transfer the top plate 3 completely to its starting position by the locking means 6 if the former does not completely reach it by itself.

In a further alternative embodiment it is possible to return the top plate 3 to its starting position by using the positioning crank 1.

It likewise corresponds to the intention of the invention to simultaneously use a respective sliding device at each wheel of an axle during the track measurement. Thus, it is possible to determine the trail angle on the right and left wheels of an axle and on a plurality of axles, respectively, at the same time.

The above-mentioned features and exemplarily described embodiments of the present invention may arbitrarily be combined with each other in part or as a whole to form further embodiments adapted to corresponding applications of the invention. As far as such embodiments result from the above-mentioned exemplary embodiments for a person skilled in the art, they are to be considered as implicitly disclosed by the above exemplary embodiments. All value ranges stated in the present description also comprise the boundary values.

I claim:

1. A sliding device for receiving vehicle wheels in a substantially stress-free manner, comprising:
   a carrier unit, and
   a top plate slidably supported on the carrier unit, wherein by using the top plate a vehicle wheel may substantially be borne in an approximately force-free and torque-free manner at least in a horizontal direction.

2. The device according to claim 1, wherein the breakaway force and/or the initial breakaway torque is substantially independent of the outer dimensions, in particular the length, and/or the weight of the top plate.

3. The device according to claim 1, wherein at least one bearing unit is provided between the carrier unit and the top plate, with which
   a lateral movement of the top plate, substantially perpendicular to a longitudinal axis of a vehicle, and
   a rotational movement of the top plate, substantially about a vertical axis of a vehicle, may be performed.

4. The device according to claim 1, wherein a locking means is provided with which the top plate may be firmly locked with respect to the carrier unit, wherein forces occurring in the wheel and acting substantially horizontally may be carried over via the top plate to the carrier unit by the locking means, and/or the top plate may be transferred to a predetermined position with respect to the carrier unit by using the locking means.

5. The device according to claim 1, wherein a positioning means is provided with which the bearing unit may be transferred to a predetermined position if the top plate is not in contact with a vehicle wheel and is in an unlocked state.

6. The device according to claim 1, wherein the bearing unit as well as the top plate may be transferred to a predetermined position by using the positioning means if the top plate is not in contact with a vehicle wheel and is in an unlocked state.

7. The device according to claim 1, wherein the positioning means is a spring member and/or the locking means is a marking bolt and/or a positioning crank.

8. The device according to claim 1, wherein the bearing unit has a cage and roll bodies in the shape of balls, the cage being filled with balls.

9. The device according to claim 1, wherein the carrier unit has at least one device for removing moisture and/or soil particles, arranged such on the carrier unit that access of the moisture and/or the soil particles to the bearing unit may be prevented.

10. The device according to claim 1, wherein the device for removing moisture and/or soil particles is at least one drain channel running substantially parallel to an edge of the top plate at least in sections.

11. The lifting device according to claim 1, wherein
   two drain channels running substantially parallel to each other are provided on the carrier unit, wherein the top plate covers at least one drain channel at least in part across the entire length thereof in a position in which the top plate is maximally shifted with respect to the carrier unit.

12. The device according to claim 1, wherein a guiding member is provided
   for determining the direction of the lateral movement between the carrier unit and the top plate and/or for determining the rotational movement of the carrier unit about the vertical axis of the vehicle.

13. The device according to claim 1, wherein a measuring and evaluating unit is provided with which the trail angle of the right and/or the left wheel of a vehicle axis may respectively be output.

14. The device according to claim 1, wherein the device is formed as a mobile unit and/or may be retrofitted on running rails of lifting platforms and/or test stands.

15. A lifting device, particularly for lifting vehicles, comprising:
   at least one lifting unit,
   at least one running rail, and
   at least one sliding device according to claim 1, wherein the carrier unit of the sliding device is substantially firmly connected to the running rail.

* * * * *